(12) United States Patent
Zhang et al.

(10) Patent No.: US 11,751,306 B2
(45) Date of Patent: Sep. 5, 2023

(54) BUCK TOPOLOGICAL CIRCUIT FOR POWER SUPPLY

(71) Applicants: OPPLE LIGHTING CO., LTD., Shanghai (CN); SUZHOU OPPLE LIGHTING CO., LTD., Suzhou (CN)

(72) Inventors: Pingwei Zhang, Suzhou (CN); Weiwei Yang, Suzhou (CN)

(73) Assignees: Suzhou Opple Lighting Co., Ltd., Suzhou (CN); Opple Lighting Co., Ltd., Shanghai (CN)

( * ) Notice: Subject to any disclaimer, the term of this patent is extended or adjusted under 35 U.S.C. 154(b) by 63 days.

(21) Appl. No.: 17/564,176

(22) Filed: Dec. 28, 2021

(65) Prior Publication Data

US 2022/0124888 A1 Apr. 21, 2022

Related U.S. Application Data

(63) Continuation of application No. PCT/CN2020/111260, filed on Aug. 26, 2020.

(30) Foreign Application Priority Data

Sep. 11, 2019 (CN) .......................... 201921513333.9

(51) Int. Cl.
*H05B 45/345* (2020.01)
*H05B 45/375* (2020.01)
*H02M 7/06* (2006.01)

(52) U.S. Cl.
CPC ............ *H05B 45/345* (2020.01); *H02M 7/06* (2013.01); *H05B 45/375* (2020.01)

(58) Field of Classification Search
CPC ...... H05B 45/345; H05B 45/375; H02M 7/06
See application file for complete search history.

(56) References Cited

U.S. PATENT DOCUMENTS

| | | | | |
|---|---|---|---|---|
| 2007/0182338 A1* | 8/2007 | Shteynberg | ............ | H05B 45/10 315/200 R |
| 2011/0140616 A1* | 6/2011 | Yan | ........................ | H05B 45/30 315/186 |
| 2013/0328493 A1* | 12/2013 | Munday | ............... | H05B 45/345 315/201 |

(Continued)

FOREIGN PATENT DOCUMENTS

| | | |
|---|---|---|
| CN | 102723880 A | 10/2012 |
| CN | 102497098 A | 12/2018 |
| CN | 108990212 A | 12/2018 |

(Continued)

OTHER PUBLICATIONS

International Search Report of PCT Application No. PCT/CN2020/111260 dated Dec. 7, 2020 with English translation, (5p).

*Primary Examiner* — Jue Zhang
(74) *Attorney, Agent, or Firm* — Arch & Lake LLP

(57) ABSTRACT

Examples of the present disclosure provides a BUCK topological circuit for power supply including a rectification circuit, a first filter energy-storage circuit, a step-down constant-current driver chip, an output current setting circuit, a freewheeling circuit, a transformer, and a second filter energy-storage circuit. An external power supply capacitor is not required in the step-down constant-current driver chip.

8 Claims, 2 Drawing Sheets

(56) References Cited

U.S. PATENT DOCUMENTS

2016/0044754 A1* 2/2016 Xu .................. H05B 45/10
　　　　　　　　　　　　　　　　　　　315/186
2019/0041008 A1* 2/2019 Xiong ................ F21K 9/278

FOREIGN PATENT DOCUMENTS

| CN | 210518944 U | 5/2020 |
| KR | 20110136537 A | 12/2011 |
| KR | 101225106 B1 | 1/2013 |
| WO | 2009004529 A2 | 1/2009 |

* cited by examiner

BUCK TOPOLOGICAL CIRCUIT FOR POWER SUPPLY

CROSS-REFERENCE TO RELATED APPLICATIONS

This application is based upon and claims the priority of PCT patent application No. PCT/CN2020/111260 filed on Aug. 26, 2020 which claims priority to the Chinese patent application No. 201921513333.9 filed on Sep. 11, 2019, the entire contents of which are hereby incorporated by reference herein for all purposes.

TECHNICAL FIELD

The present disclosure relates to the technical field of power supply, and in particular to a BUCK topological circuit for power supply.

BACKGROUND

For the BUCK topological circuit for power supply and having an external power supply capacitor, in the case of an external power interruption, the power supply capacitor can be quickly stepped down to working undervoltage of a chip, causing the chip to stop working, and then, electric energy in a filter energy-storage capacitor of the circuit is slowly released, which results in that an output voltage can still keep an light-emitting diode (LED) shimmering or flickering.

SUMMARY

The present disclosure provides a BUCK topology circuit for power supply.

The BUCK topology circuit for power supply may include:

a rectification circuit, connected to input terminals, a first output terminal, and an earth wire and configured to convert an alternating-current signal at the input terminals to a direct-current signal and transmit the direct-current signal to the first output terminal;

a first filter energy-storage circuit, connected to the first output terminal and the earth wire and configured to filter a signal at the first output terminal and store electric energy;

a step-down constant-current driver chip, having an input terminal connected to the first output terminal, so that a voltage at the input terminal is consistent with a bus voltage, a drain electrode connected to a first node and a current sampling terminal connected to a second node so that the step-down constant-current driver chip responses to the signal at the first output terminal to work, wherein the step-down constant-current driver chip does not require an external power supply capacitor;

an output current setting circuit, connected to the second node and the earth wire and configured to set an output current;

a freewheeling circuit, connected to the first output terminal and the first node;

a transformer, connected to the first node and a second output terminal and configured to convert a voltage between the first output terminal and the first node to an output voltage; and a second filter energy-storage circuit, connected to the first output terminal and the second output terminal and configured to filter the signal at the first output terminal and store electric energy.

It is to be understood that both the foregoing general description and the following detailed description are exemplary and explanatory only and are not restrictive of the present disclosure.

BRIEF DESCRIPTION OF THE DRAWINGS

To describe the technical solutions in one or more examples of this disclosure, the following briefly describes the accompanying drawings required for describing the examples. Apparently, the accompanying drawings in the following description show merely some examples specified in the one or more examples of this disclosure, and a person of ordinary skill in the art can still arrive at other drawings from the accompanying drawings without creative efforts.

DETAILED DESCRIPTION

One or more examples of this disclosure provide(s) a BUCK topological circuit for power supply, to solve the problem that an area of the circuit is large and cost is high since electrical energy in capacitor is rapidly released by increasing the load in other implementations.

In order to enable a person skilled in the art to better understand the technical solutions in the one or more examples of this disclosure, the technical solutions in the one or more examples of this disclosure will be clearly and completely described below in combination with the accompanying drawings in the one or more examples of this disclosure. Apparently, the described examples are not all examples but part of examples of this disclosure. All other examples obtained by a person of ordinary skill in the art based on the one or more examples of this disclosure without creative efforts shall fall within the protection scope of the one or more examples of this disclosure.

In order to avoid that the LED remains shimmering or flickering after a power interruption, a load is required to be connected in parallel to an output terminal so that the electric energy in the filter energy-storage capacitor can be quickly released through the load. However, in this method, the electric energy in the capacitor is quickly released by adding the load, which results in an increase of area and cost of the circuit.

Figure 1:
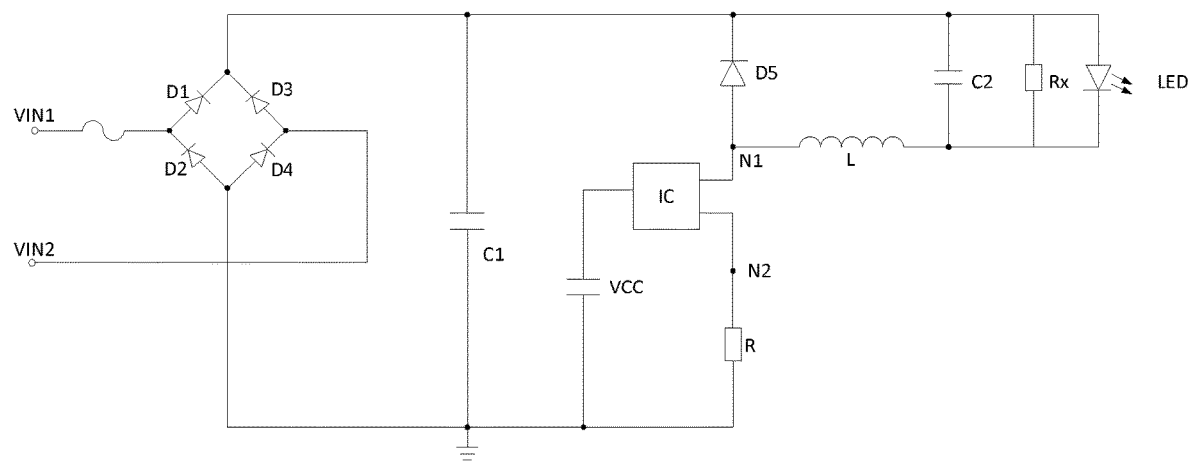
FIG. 1 is a first schematic structural diagram of a BUCK topological circuit for power supply and having an external power supply capacitor, provided in the related art.

FIG. 1 is a first schematic structural diagram of a BUCK topological circuit for power supply and having an external power supply capacitor, provided in the related art. In the circuit, an external power supply capacitor VCC is charged, so that a chip IC starts to work when a voltage of the external power supply capacitor VCC is greater than a cut-in voltage of the chip IC. At this time, the entire circuit in FIG. 1 also starts to work, to drive an LED connected to an output terminal to emit light. After providing of an alternating-current signal to input terminals of the circuit is stopped, the voltage of the external power supply capacitor VCC can be quickly dropped and lower than working undervoltage of the chip IC, so that the chip IC stops working. At this time, if electric energy in a first filter energy-storage capacitor C1 and a second filter energy-storage capacitor C2 is required to be quickly released, a load RX is required to be connected in parallel between two terminals of the second filter energy-storage capacitor C2, so that the electric energy in the first filter energy-storage capacitor C1 and the second filter energy-storage capacitor C2 is quickly released through the load RX, avoiding that an output voltage can still keep the LED shimmering or flickering after a power interruption.

Figure 2:
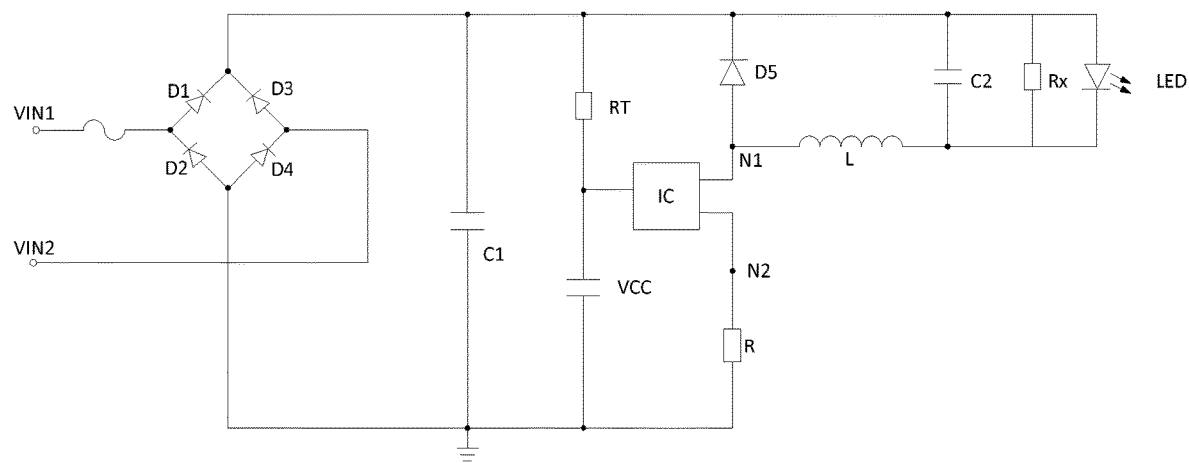
FIG. 2 is a second schematic structural diagram of a BUCK topological circuit for power supply and having an external power supply capacitor, provided in the related art.

FIG. 2 is a second schematic structural diagram of a BUCK topological circuit for power supply and having an external power supply capacitor, provided in the related art. In the circuit, a charging resistor RT charges an external power supply capacitor VCC, so that a chip IC starts to work when a voltage of the external power capacitor VCC is greater than a cut-in voltage of the chip IC. At this time, the entire circuit in FIG. 2 also starts to work, to drive an LED connected to an output terminal to emit light. After providing of an alternating-current signal to input terminals of the circuit is stopped, the voltage of the external power supply capacitor VCC can be quickly dropped and lower than working undervoltage of the chip IC, so that the chip IC stops working. At this time, if electric energy in a first filter energy-storage capacitor C1 and a second filter energy-storage capacitor C2 is required to be quickly released, a load RX is required to be connected in parallel between two terminals of the second filter energy-storage capacitor C2, so that the electric energy in the first filter energy-storage capacitor C1 and the second filter energy-storage capacitor C2 is quickly released through the load RX, avoiding that an output voltage can still keep the LED shimmering or flickering after a power interruption.

In summary, in order to avoid that the LED remains shimmering or flickering after a power interruption, the load RX is connected in parallel between two terminals of the second filter energy-storage capacitor C2, so that the electric energy in the first filter energy-storage capacitor C1 and the second filter energy-storage capacitor C2 is quickly released through the load RX, ensuring that the LED cannot be shimmering or flickering after the power interruption. However, in the above method, the load RX is required to be added, which results in an increase of the area and cost of the circuit.

Figure 3:
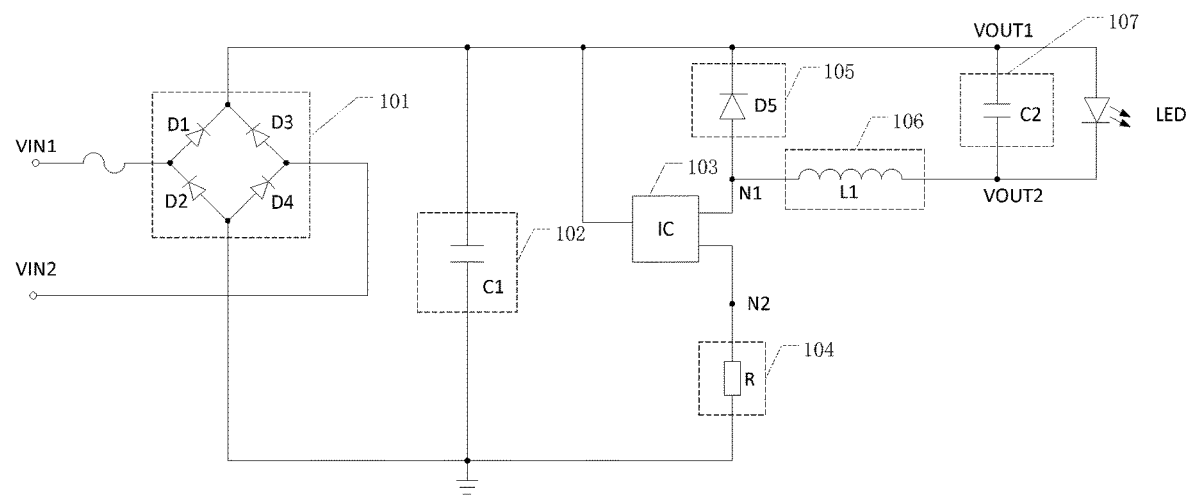
FIG. 3 is a first schematic structural diagram of a BUCK topological circuit for power supply according to an example of the present disclosure.

For solving the above problem, an example of the present disclosure provides a BUCK topological circuit for power supply. As illustrated in FIG. 3, the BUCK topological circuit for power supply can include a rectification circuit 101, a first filter energy-storage circuit 102, a step-down constant-current driver chip 103, an output current setting circuit 104, a freewheeling circuit 105, a transformer 106, and a second filter energy-storage circuit 107.

The rectification circuit 101 is connected to input terminals (VIN1 and VIN2), a first output terminal VOUT1, and an earth wire, and is configured to convert an alternating-current signal at the input terminals (VIN1 and VIN2) to a direct-current signal, and transmit the direct-current signal to the first output terminal VOUT1.

The first filter energy-storage circuit 102 is connected to the first output terminal VOUT1 and the earth wire and is configured to filter the signal at the first output terminal VOUT1 and store electric energy.

For the step-down constant-current driver chip 103, an input terminal thereof is connected to the first output terminal VOUT1, so that a voltage at the input terminal is consistent with a bus voltage, where the bus voltage is higher than a cut-in voltage of the step-down constant-current driver chip 103; a drain electrode thereof is connected to a first node N1 and a current sampling terminal thereof is connected to a second node N2, so that working is implemented in response to the signal at the first output terminal VOUT1, where the step-down constant-current driver chip 103 does not require an external power supply capacitor, that is, the step-down constant-current driver chip 103 without an external power supply capacitor is selected here. It is to be noted that the drain electrode of the step-down constant-current driver chip 103 is a drain electrode of a built-in MOSFET in the step-down constant-current driver chip 103; in addition, the input terminal of the step-down constant-current driver chip 103 is connected to the first output terminal VOUT1, so that the step-down constant-current driver chip 103 is driven in a high-voltage driving manner. The chip starts to work when the bus voltage is higher than the cut-in voltage of the chip, that is, when the chip starts to work, the bus voltage is a relatively high voltage, and the relatively high voltage is used to drive the step-down constant-current driver chip 103.

The output current setting circuit 104 is connected to the second node N2 and the earth wire, and is configured to set an output current.

The freewheeling circuit 105 is connected to the first output terminal VOUT1 and the first node N1.

The transformer 106 is connected to the first node N1 and a second output terminal VOUT2, and is configured to convert a voltage between the first output VOUT1 and the first node N1 to an output voltage. For example, if the voltage between the first output voltage VOUT1 and the first node N1 is 200V and a voltage at the output terminal is 10V, the transformer 106 is required to convert the voltage from 200V to 10V, thereby satisfying output requirements of the circuit.

The second filter energy-storage circuit 107 is connected to the first output terminal VOUT1 and the second output terminal VOUT2 and is configured to filter the signal at the first output terminal VOUT1 and store electric energy.

During working of the BUCK topological circuit for power supply, an alternating-current signal is provided to the input terminals (VIN1 and VIN2) first, the rectification circuit 101 converts the alternating-current signal to a direct-current signal and transmits the direct-current signal to the first output terminal VOUT1, the first filter energy-storage circuit 102 and the second filter energy-storage circuit 107 filter the signal at the first output terminal VOUT1 and store electric energy, the step-down constant-current driver chip 103 extracts power from the first output terminal VOUT1, if the signal at the first output terminal VOUT1 is higher than the cut-in voltage of the step-down constant-current driver chip 103, the step-down constant-current driver chip 103 starts to work, and at this time, the BUCK topological circuit for power supply also starts to work, to supply power to a light-emitting element connected between the first output terminal VOUT1 and the second output terminal VOUT2, thereby driving the light-emitting element to emit light.

Specifically, during working of the step-down constant-current driver chip 103, the built-in MOSFET in the step-down constant-current driver chip 103 is subjected to an operation of on or off at a certain frequency. When the built-in MOSFET is on, a working loop of the BUCK topological circuit for power supply is: power is transmitted from the first output terminal VOUT1, the light-emitting element connected between the first output terminal VOUT1 and the second output terminal VOUT2, the second output terminal VOUT2, the transformer 106, the first node N1, the step-down constant-current driver chip 103, the second node N2, and the output current setting circuit 104 to the earth wire. When the built-in MOSFET is off, a working loop of the BUCK topological circuit for power supply is: power is transmitted from the first output terminal VOUT1, the light-emitting element connected between the first output terminal VOUT1 and the second output terminal VOUT2, the second output terminal VOUT2, the transformer 106, and the first node N1 to the freewheeling circuit 105.

Then, when input of the alternating-current signal to the input terminals (VIN1 and VIN2) is stopped, the first filter energy-storage circuit 102 and the second filter energy-storage circuit 107 discharge to the first output terminal VOUT1. At this time, the input terminal of the step-down constant-current driver chip 103 responds to the signal at the first output terminal VOUT1, and the step-down constant-current driver chip 103 still maintains at a working state. The signal at the first output terminal VOUT1 is gradually stepped down. Before the signal at the first output terminal VOUT1 is stepped down to a cut-in voltage of the light-emitting element, the step-down constant-current driver chip 103 still maintains at a working state, and the light-emitting element keeps emitting light. When the signal at the first output terminal VOUT1 is just lower than the cut-in voltage of the light-emitting element, the light-emitting element stops emitting light while the step-down constant-current driver chip 103 still maintains at a working state. In a process that the signal at the first output terminal VOUT1 is stepped down from just below the cut-in voltage of the light-emitting element to working undervoltage of the step-down constant-current driver chip 103, the step-down constant-current driver chip 103 still maintains at a working state, and at this time, the first filter energy-storage circuit 102 and the second filter energy-storage circuit 107 discharge through a loop formed by the first output terminal VOUT1, the step-down constant-current driver chip 103, the output current setting circuit 104, and the earth wire so that the electric energy in the first filter energy-storage circuit 102 and the second filter energy-storage circuit 107 is quickly released, avoiding that the light-emitting element remains shimmering and flickering after a power interruption. Compared with other implementations, the electric energy in the first filter energy-storage circuit 102 and the second filter energy-storage circuit 107 can be quickly released without adding any load, and thus the area and cost of the circuit is reduced.

It is to be noted that, the light-emitting element can be an LED, for example. A count of the LED can be set according to needs, which is not specifically limited in this example. In addition, in the foregoing BUCK topological circuit for power supply, the output voltage can be determined by setting parameters of the transformer 106, or the output current can be set by setting parameters of the output current setting circuit 104.

Specific structures and connection modes of various circuits in the foregoing BUCK topological circuit for power supply will be described below in detail.

As illustrated in FIG. 3, the BUCK topological circuit for power supply can include a rectification circuit 101, a first filter energy-storage circuit 102, a step-down constant-current driver chip 103, an output current setting circuit 104, a freewheeling circuit 105, a transformer 106, and a second filter energy-storage circuit 107.

The input terminals (VIN1 and VIN2) can include a first input terminal VIN1 and a second input terminal VIN2.

Based on this, the rectification circuit 101 can include:

a first diode D1, where a first electrode is connected to the first input terminal VIN1, and a second electrode is connected to the first output terminal VOUT1;

a second diode D2, where a first electrode is connected to the earth wire, and a second electrode is connected to the first input terminal VIN1;

a third diode D3, where a first electrode is connected to the second input terminal VIN2, and a second electrode is connected to the first output terminal VOUT1; and a fourth diode D4, where a first electrode is connected to the earth wire, and a second electrode is connected to the second input terminal VIN2.

Specifically, the first electrodes of the first diode to the fourth diode (D1 to D4) can be positive electrodes, and the second electrodes of the first diode to the fourth diode (D1 to D4) can be negative electrodes.

The first filter energy-storage circuit 102 can include:

a first filter energy-storage capacitor C1, where a first terminal is connected to the first output terminal VOUT1, and a second terminal is connected to the earth wire. Specifically, the first terminal of the first filter energy-storage circuit capacitor C1 can be a positive electrode, and the second terminal thereof can be a negative electrode.

The output current setting circuit 104 can include:

a resistor R, where a first terminal is connected to the second node N2, and a second terminal is connected to the earth wire. Specifically, a size of the output current can be set by setting a resistance value of the resistor R.

The freewheeling circuit 105 can include:

a freewheeling diode D5, where a first electrode is connected to the first node N1, and a second electrode is connected to the first output terminal VOUT1. Specifically, the first electrode of the freewheeling diode D5 can be a positive electrode and the second electrode thereof can be a negative electrode.

The transformer 106 can include:

a first inductor L1, where a first terminal is connected to the first node N1, and a second terminal is connected to the second output terminal VOUT2. It is to be noted that a size of the output voltage can be set by setting parameters of the first inductor L1.

The second filter energy-storage circuit 107 can include:

a second filter energy-storage capacitor C2, where a first terminal is connected to the first output terminal VOUT1, and a second terminal is connected to the second output terminal VOUT2. Specifically, the first terminal of the second filter energy-storage capacitor C2 can be a positive electrode, and the second terminal thereof can be a negative electrode.

A specific working process of the foregoing BUCK topological circuit for power supply will be described below.

An alternating-current signal is provided to the first input terminal VIN1 and the second input terminal VIN2 first, the rectification circuit 101 including the first diode to the fourth diode (D1 to D4) converts the alternating-current signal to a direct-current signal, and transmits the direct-current signal to the first output terminal VOUT1, and the first filter energy-storage capacitor C1 and the second filter energy-storage capacitor C2 filter the signal at the first output terminal VOUT1 while performing energy storage; an input terminal of the step-down constant-current driver chip 103 extracts power from the first output terminal VOUT1, if the signal (i.e., voltage) at the first output terminal VOUT1 is higher than the cut-in voltage of the step-down constant-current driver chip 103, the step-down constant-current driver chip 103 starts to work, and at this time, the BUCK topological circuit for power supply also starts to work, to drive a light-emitting element connected between the first output terminal VOUT1 and the second output terminal VOUT2 to emit light. Specifically, during working of the step-down constant-current driver chip 103, a built-in NOSFET in the step-down constant-current driver chip 103 is subjected to an operation of on or off at a certain frequency. When the built-in NOSFET is on, a working loop of the BUCK topological circuit for power supply is: power is transmitted from the first output terminal VOUT1, the light-emitting element connected between the first output terminal VOUT1 and the second output terminal VOUT2, the second output terminal VOUT2, the first inductor L1, the first node N1, the step-down constant-current driver chip 103, the second node N2, and the resistor R to the earth wire. When the built-in NOSFET is off, a working loop of the BUCK topological circuit for power supply is: power is transmitted from the first output terminal VOUT1, the light-emitting element connected between the first output terminal VOUT1 and the second output terminal VOUT2, the second output terminal VOUT2, the first inductor L, and the first node N1 to the freewheeling diode D5.

Then, when input of the alternating-current signal to the first input terminal VIN1 and the second input terminal VIN2 is stopped, the first filter energy-storage capacitor C1 and the second filter energy-storage capacitor C2 start to discharge to the first output terminal VOUT1. At this time, the input terminal of the step-down constant-current driver chip 103 responds to the signal at the first output terminal VOUT1, and the step-down constant-current driver chip 103 still maintains at a working state. The signal at the first output terminal VOUT1 is gradually stepped down. Before the signal at the first output terminal VOUT1 is stepped down to a cut-in voltage of the light-emitting element, the step-down constant-current driver chip 103 still maintains at a working state, and the light-emitting element keeps emitting light. When the signal at the first output terminal VOUT1 is just lower than the cut-in voltage of the light-emitting element, the light-emitting element stops emitting light while the step-down constant-current driver chip 103 still maintains at a working state. In a process that the signal at the first output terminal VOUT1 is stepped down from just below the cut-in voltage of the light-emitting element to the working undervoltage of the step-down constant-current driver chip 103, the step-down constant-current driver chip 103 still maintains at a working state, and at this time, the first filter energy-storage capacitor C1 and the second filter energy-storage capacitor C2 discharge through a loop formed by the first output terminal VOUT1, the step-down constant-current driver chip 103, the resistor R, and the earth wire so that the electric energy in the first filter energy-storage capacitor C1 and the second filter energy-storage capacitor C2 is quickly released, avoiding that the light-emitting element remains shimmering and flickering after a power interruption. Compared with other implementations, the electric energy in the first filter energy-storage circuit 102 and the second filter energy-storage circuit 107 can be quickly released without adding any load, and thus the area and cost of the circuit is reduced.

Figure 4:
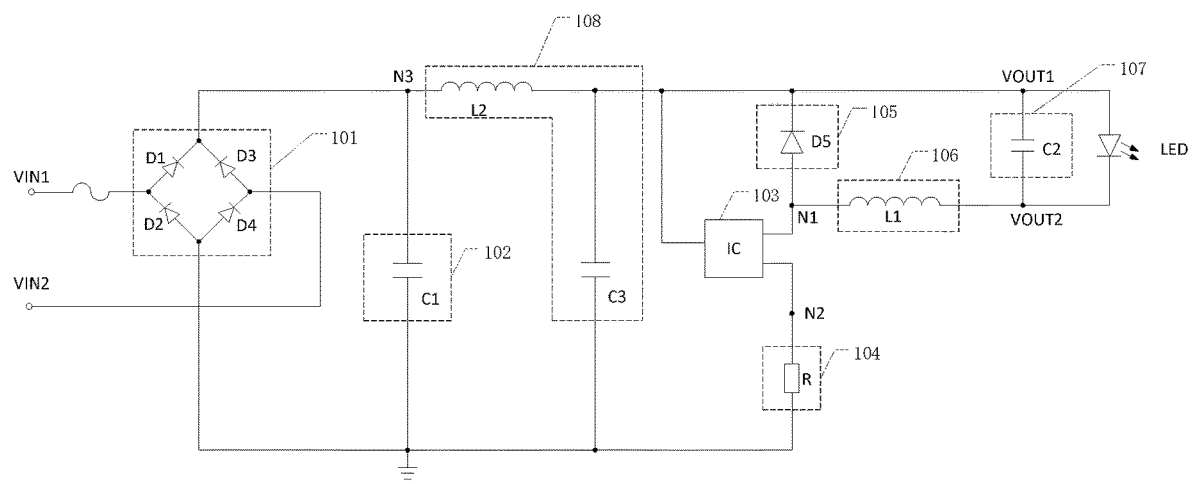
FIG. 4 is a second schematic structural diagram of a BUCK topological circuit for power supply according to an example of the present disclosure.

Further, in order to improve stability of an output signal of the BUCK topological circuit for power supply, as illustrated in FIG. 4, an example of the present disclosure further provides a BUCK topological circuit for power supply. FIG. 4 is a second schematic structural diagram of a BUCK topological circuit for power supply according to an example of the present disclosure. It can be seen from FIG. 4, the BUCK topological circuit for power supply can include: a rectification circuit 101, a first filter energy-storage circuit 102, a step-down constant-current driver chip 103, an output current setting circuit 104, a freewheeling circuit 105, a transformer 106, a second filter energy-storage circuit 107, and a third filter energy-storage circuit 108.

The rectification circuit 101 is connected to input terminals (VIN1 and VIN2), a third node N3, and an earth wire, and is configured to convert an alternating-current signal at the input terminals (VIN1 and VIN2) to a direct-current signal and transmit the direct-current signal to the third node N3.

The first filter energy-storage circuit 102 is connected to the third node N3 and the earth wire, and is configured to filter the signal at the third node N3 and store electric energy.

The third filter energy-storage circuit 108 is connected to the third node N3, the first output terminal VOUT1 and the earth wire, and is configured to filter the signal at the third node N3 and store electric energy, and transmit a signal obtained by filtering the signal at the third node N3 to the first output terminal VOUT1.

For the step-down constant-current driver chip 103, an input terminal thereof is connected to the first output terminal VOUT1, a drain electrode thereof is connected to a first node N1, and a current sampling terminal thereof is connected to a second node N2, so that working is implemented in response to the signal at the first output terminal VOUT1, where the step-down constant-current driver chip 103 does not require an external power supply capacitor, that is, the step-down constant-current driver chip 103 without an external power supply capacitor is selected here. It is to be noted that the drain electrode of the step-down constant-current driver chip 103 is a drain electrode of a built-in MOSFET in the step-down constant-current driver chip 103; in addition, the input terminal of the step-down constant-current driver chip 103 is connected to the first output terminal VOUT1 so that the step-down constant-current driver chip 103 is driven in a high-voltage driving manner.

The output current setting circuit 104 is connected to the second node N2 and the earth wire and is configured to set an output current.

The freewheeling circuit 105 is connected to the first output terminal VOUT1 and the first node N1.

The transformer 106 is connected to the first node N1 and a second output terminal VOUT2 and is configured to convert a voltage between the first output terminal VOUT1 and the first node N1 to an output voltage.

The second filter energy-storage circuit 107 is connected to the first output terminal VOUT1 and the second output terminal VOUT2 and is configured to filter the signal at the first output terminal VOUT1 and store electric energy.

During working of the BUCK topological circuit for power supply, an alternating-current signal is provided to the input terminals (VIN1 and VIN2) first, the rectification circuit 101 converts the alternating-current signal to a direct-current signal and transmits the direct-current signal to the third node N3, the first filter energy-storage circuit 102 and the third filter energy-storage circuit 108 filter the signal at the third node N3 and stores electric energy, the third filter energy-storage circuit 108 transmits a signal obtained by filtering to the first output terminal VOUT1, and the second filter energy-storage circuit 107 filters the signal at the first output terminal VOUT1 and stores electric energy; the input terminal of the step-down constant-current driver chip 103 extracts power from the first output terminal VOUT1, if the signal at the first output terminal VOUT1 is higher than a cut-in voltage of the step-down constant-current driver chip 103, the step-down constant-current driver chip 103 starts to work, and at this time, the BUCK topological circuit for power supply also starts to work, to supply power to a light-emitting element connected between the first output terminal VOUT1 and the second output terminal VOUT2, thereby driving the light-emitting element to emit light.

Specifically, during working of the step-down constant-current driver chip 103, the built-in MOSFET in the step-down constant-current driver chip 103 is subjected to an operation of on or off at a certain frequency. When the built-in MOSFET is on, a working loop of the BUCK topological circuit for power supply is: power is transmitted from the first output terminal VOUT1, the light-emitting element connected between the first output terminal VOUT1 and the second output terminal VOUT2, the second output terminal VOUT2, the transformer 106, the first node N1, the step-down constant-current driver chip 103, the second node N2, and the output current setting circuit 104 to the earth wire. When the built-in MOSFET is off, a working loop of the BUCK topological circuit for power supply is: power is transmitted from the first output terminal VOUT1, the light-emitting element connected between the first output terminal VOUT1 and the second output terminal VOUT2, the second output terminal VOUT2, the transformer 106, and the first node N1 to the freewheeling circuit 105.

Then, when input of the alternating-current signal to the input terminals (VIN1 and VIN2) is stopped, the first filter energy-storage circuit 102, the second filter energy-storage circuit 107 and the third filter energy-storage circuit 108 discharge to the first output terminal VOUT1. At this time, the input terminal of the step-down constant-current driver chip 103 responds to the signal at the first output terminal VOUT1, and the step-down constant-current driver chip 103 still maintains at a working state. The signal at the first output terminal VOUT1 is gradually stepped down. Before the signal at the first output terminal VOUT1 is stepped down to a cut-in voltage of the light-emitting element, the step-down constant-current driver chip 103 still maintains at a working state, and the light-emitting element keeps emitting light. When the signal at the first output terminal VOUT1 is just lower than the cut-in voltage of the light-emitting element, the light-emitting element stops emitting light while the step-down constant-current driver chip 103 still maintains at a working state. In a process that the signal at the first output terminal VOUT1 is stepped down from just below the cut-in voltage of the light-emitting element to the working undervoltage of the step-down constant-current driver chip 103, the step-down constant-current driver chip 103 still maintains at a working state, and at this time, the first filter energy-storage circuit 102, the second filter energy-storage circuit 107, and the third filter energy-storage circuit 108 discharge through a loop formed by the first output terminal VOUT1, the step-down constant-current driver chip 103, the output current setting circuit 104, and the earth wire so that the electric energy in the first filter energy-storage circuit 102, the second filter energy-storage circuit 107, and the third filter energy-storage circuit 108 is quickly released, avoiding that the light-emitting element remains shimmering and flickering after a power interruption. Moreover, compared with other implementations, the electric energy in the first filter energy-storage circuit 102, the second filter energy-storage circuit 107 and the third filter energy-storage circuit 108 can be quickly released without adding any load, and thus the area and cost of the circuit is reduced. In addition, the first filter energy-storage circuit 102, the second filter energy-storage circuit 107, and the third filter energy-storage circuit 108 filter the signal, a stage of filter energy-storage circuit is added as compared with the BUCK topological circuit for power supply in FIG. 3, which makes the output signal more stable.

Specific structures and connection modes of various circuits in the foregoing BUCK topological circuit for power supply will be described below in detail.

As illustrated in FIG. 4, the BUCK topological circuit for power supply can include: a rectification circuit 101, a first filter energy-storage circuit 102, a step-down constant-current driver chip 103, an output current setting circuit 104, a freewheeling circuit 105, a transformer 106, a second filter energy-storage circuit 107, and a third filter energy-storage circuit 108.

The input terminals (VIN1 and VIN2) can include a first input terminal VIN1 and a second input terminal VIN2.

Based on this, the rectification circuit 101 can include:

a first diode D1, where a first electrode is connected to the first input terminal VIN1, and a second electrode is connected to a third node N3;

a second diode D2, where a first electrode is connected to the earth wire, and a second electrode is connected to the first input terminal VIN1;

a third diode D3, where a first electrode is connected to the second input terminal VIN2, and a second electrode is connected to a third node N3;

a fourth diode D4, where a first electrode is connected to the earth wire, and a second electrode is connected to the second input terminal VIN2.

Specifically, the first electrodes of the first diode to the fourth diode (D1 to D4) can be positive electrodes, and the second electrodes of the first diode to the fourth diode (D1 to D4) can be negative electrodes.

The first filter energy-storage circuit 102 can include:

a first filter energy-storage capacitor C1, where a first terminal is connected to the third node N3, and a second terminal is connected to the earth wire. Specifically, the first terminal of the first filter energy-storage circuit capacitor C1 can be a positive electrode, and the second terminal thereof can be a negative electrode.

The third filter energy-storage circuit 108 can include:

a second inductor L2, where a first terminal is connected to the third node N3, and a second terminal is connected to the first output terminal VOUT1; and a third filter energy-storage capacitor C3, where a first terminal is connected to the first output terminal VOUT1, and a second terminal is connected to the earth wire.

The output current setting circuit 104 can include:

a resistor R, where a first terminal is connected to the second node N2, and a second terminal is connected to the earth wire. Specifically, a size of the output current can be set by setting a resistance value of the resistor R.

The freewheeling circuit 105 can include:

a freewheeling diode D5, where a first electrode is connected to the first node N1, and a second electrode is connected to the first output terminal VOUT1. Specifically, the first electrode of the freewheeling diode D5 can be a positive electrode and the second electrode thereof can be a negative electrode.

The transformer 106 can include:

a first inductor L1, where a first terminal is connected to the first node N1, and a second terminal is connected to the second output terminal VOUT2. It is to be noted that a size of the output voltage can be set by setting parameters of the first inductor L1.

The second filter energy-storage circuit 107 can include:

a second filter energy-storage capacitor C2, where a first terminal is connected to the first output terminal VOUT1, and a second terminal is connected to the second output terminal VOUT2. Specifically, the first terminal of the second filter energy-storage capacitor C2 can be a positive electrode, and the second terminal thereof can be a negative electrode.

A specific working process of the foregoing BUCK topological circuit for power supply will be described below.

An alternating-current signal is provided to the first input terminal VIN1 and the second input terminal VIN2 first, the rectification circuit 101 including the first diode to the fourth diode (D1 to D4) converts the alternating-current signal to a direct-current signal, and transmits the direct-current signal to the third node N3, the first filter energy-storage capacitor C1, and the third filter energy-storage capacitor C3 and the second inductor L2 filter the signal at the third node N3 while performing energy storage, and transmit the filtered signal to the first output terminal VOUT1, and the second filter energy-storage capacitor C2 filters the signal at the first output terminal VOUT1 and stores electric energy; an input terminal of the step-down constant-current driver chip 103 extracts power from the first output terminal VOUT1, if the signal (i.e., voltage) at the first output terminal VOUT1 is higher than a cut-in voltage of the step-down constant-current driver chip 103, the step-down constant-current driver chip 103 starts to work, and at this time, the BUCK topological circuit for power supply also starts to work, to drive a light-emitting element connected between the first output terminal VOUT1 and the second output terminal VOUT2 to emit light. Specifically, during working of the step-down constant-current driver chip 103, a built-in MOSFET in the step-down constant-current driver chip 103 is subjected to an operation of on or off at a certain frequency. When the built-in MOSFET is on, a working loop of the BUCK topological circuit for power supply is: power is transmitted from the first output terminal VOUT1, the light-emitting element connected between the first output terminal VOUT1 and the second output terminal VOUT2, the second output terminal VOUT2, the first inductor L1, the first node N1, the step-down constant-current driver chip 103, the second node N2, and the resistor R to the earth wire. When a built-in switch element is off, a working loop of the BUCK topological circuit for power supply is: power is transmitted from the first output terminal VOUT1, the light-emitting element connected between the first output terminal VOUT1 and the second output terminal VOUT2, the second output terminal VOUT2, the first inductor L1, and the first node N1 to the freewheeling diode D5.

Then, when input of the alternating-current signal to the first input terminal VIN1 and the second input terminal VIN2 is stopped, the first filter energy-storage capacitor C1, the second filter energy-storage capacitor C2, and the third filter energy-storage capacitor C3 and the second inductor L2 start to discharge to the first output terminal VOUT1. At this time, the input terminal of the step-down constant-current driver chip 103 responds to the signal at the first output terminal VOUT1 and the step-down constant-current driver chip 103 still maintains at a working state. The signal at the first output terminal VOUT1 is gradually stepped down. Before the signal at the first output terminal VOUT1 is stepped down to a cut-in voltage of the light-emitting element, the step-down constant-current driver chip 103 still maintains at a working state, and the light-emitting element keeps emitting light. When the signal at the first output terminal VOUT1 is just lower than the cut-in voltage of the light-emitting element, the light-emitting element stops emitting light while the step-down constant-current driver chip 103 still maintains at a working state. In a process that the signal at the first output terminal VOUT1 is stepped down from just below the cut-in voltage of the light-emitting element to the working undervoltage of the step-down constant-current driver chip 103, the step-down constant-current driver chip 103 still maintains at a working state, and at this time, the first filter energy-storage capacitor C1, the second filter energy-storage capacitor C2, and the third filter energy-storage capacitor C3 and the second inductor L2 discharge through a loop formed by the first output terminal VOUT1, the step-down constant-current driver chip 103, the resistor R, and the earth wire so that the electric energy in the first filter energy-storage capacitor C1, the second filter energy-storage capacitor C2, and the third filter energy-storage capacitor C3 and the second inductor L2 is quickly released, avoiding that the light-emitting element remains shimmering and flickering after a power interruption. In addition, compared with other implementations, the electric energy on the first filter energy-storage capacitor C1, the second filter energy-storage capacitor C2, and the third filter energy-storage capacitor C3 and the second inductor L2 can be quickly released without adding any load, and thus the area and cost of the circuit is reduced. In addition, a stage of filter energy-storage circuit, namely, the second inductor L2 and the third filter energy-storage capacitor C3 is added, making the output signal more stable.

The present disclosure is to provide a BUCK topology circuit for power supply,

The one or more examples of the specification provides a BUCK topology circuit for power supply, including:

a rectification circuit, connected to input terminals, a first output terminal, and an earth wire and configured to convert an alternating-current signal at the input terminals to a direct-current signal and transmit the direct-current signal to the first output terminal;

a first filter energy-storage circuit, connected to the first output terminal and the earth wire and configured to filter a signal at the first output terminal and store electric energy;

a step-down constant-current driver chip, having an input terminal connected to the first output terminal, so that a voltage at the input terminal is consistent with a bus voltage, a drain electrode connected to a first node and a current sampling terminal connected to a second node so that the step-down constant-current driver chip responses to the signal at the first output terminal to work, wherein the step-down constant-current driver chip does not require an external power supply capacitor;

an output current setting circuit, connected to the second node and the earth wire and configured to set an output current;

a freewheeling circuit, connected to the first output terminal and the first node;

a transformer, connected to the first node and a second output terminal and configured to convert a voltage between the first output terminal and the first node to an output voltage; and a second filter energy-storage circuit, connected to the first output terminal and the second output terminal and configured to filter the signal at the first output terminal and store electric energy.

Optionally, the rectification circuit is connected to the input terminal, a third node, and the earth wire, and is configured to convert an alternating-current signal at the input terminal to a direct-current signal and transmit the direct-current signal to the third node;

the first filter energy-storage circuit is connected to the third node and the earth wire, and is configured to filter a signal at the third node and store electric energy;

the circuit further includes:

a third filter energy-storage circuit, connected to the third node, the first output terminal and the earth wire and configured to filter the signal at the third node and store electric energy, and transmit a signal obtained by filtering the signal at the third node to the first output terminal.

Optionally, the first filter energy-storage circuit includes a first filter energy-storage capacitor, having a first terminal connected to the first output terminal, and a second terminal connected to the earth wire.

Optionally, the output current setting circuit includes a resistor having a first terminal connected to the second node, and a second terminal connected to the earth wire.

Optionally, the freewheeling circuit includes: a freewheeling diode, having a first electrode connected to the first node, and a second electrode connected to the first output terminal.

Optionally, the transformer includes a first inductor, having a first terminal connected to the first node, and a second terminal connected to the second output terminal.

Optionally, the second filter energy-storage circuit includes a second filter energy-storage capacitor, having a first terminal is connected to the first output terminal, and a second terminal connected to the second output terminal.

Optionally, the third filter energy-storage circuit includes a second inductor, having a first terminal connected to the third node, and a second terminal connected to the first output terminal; and a third filter energy-storage capacitor, having a first terminal connected to the first output terminal, and a second terminal connected to the earth wire.

In the technical solutions of the one or more examples of the specification, the BUCK topological circuit for power supply includes a rectification circuit, a first filter energy-storage circuit, a step-down constant-current driver chip, an output current setting circuit, a freewheeling circuit, a transformer, and a second filter energy-storage circuit.

During working of the BUCK topological circuit for power supply, since the input terminal of the step-down constant-current driver chip is connected to the first output terminal and an external capacitor for power supply is not required, if input of the alternating-current signal to the input terminals is stopped, the first filter energy-storage circuit and the second filter energy-storage circuit discharge to the first output terminal, and the input terminal of the step-down constant-current driver chip responds to the signal at the first output terminal, and the step-down constant-current driver chip 103 still maintains at a working state. At this time, the first filter energy-storage circuit and the second filter energy-storage circuit discharge through a loop formed by the first output terminal, the step-down constant-current driver chip, and the earth wire, so that the electric energy in the first filter energy-storage circuit and the second filter energy-storage circuit is quickly released, avoiding that the light-emitting element remains shimmering and flickering after a power interruption. In addition, compared with the other implementations, the electric energy in the first filter energy-storage circuit and the second filter energy-storage circuit can be quickly released without adding any load, and thus the area and cost of the circuit is reduced.

It is to be noted that although in the above detailed description, reference has been made to a number of modules or units of the device for executing actions, such division is not mandatory. Indeed, according to the implementation mode of the present disclosure, the features and functions of two or more modules or units described above can be embodied in one module or unit. On the contrary, the features and functions of one module or unit described above can further be divided to be embodied by a plurality of modules or units.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

In addition, the various steps of the method of the present disclosure have been described in a specific sequence in the drawings, but this does not require or imply that the steps must be performed in the specific sequence, or that all illustrated steps must be performed in order to achieve the desired result. Additionally or alternatively, certain steps can be omitted, a plurality of steps can be combined into one step for execution, and/or one step can be broken into a plurality of steps for execution, and the like.

Other implementation solutions of the present disclosure will be apparent to a person skilled in the art from consideration of the specification and practice of the examples. The present disclosure is intended to cover any variations, uses, or adaptations of the present disclosure following the general principles thereof and including such departures from the present disclosure as come within known or customary practice in the art. It is intended that the specification and examples be considered as exemplary only.

The invention claimed is:

1. A BUCK topological circuit for power supply, comprising:
   a rectification circuit, connected to input terminals, a first output terminal, and an earth wire and configured to convert an alternating-current signal at the input terminals to a direct-current signal and transmit the direct-current signal to the first output terminal;
   a first filter energy-storage circuit, connected to the first output terminal and the earth wire and configured to filter a signal at the first output terminal and store electric energy;
   a step-down constant-current driver chip, having an input terminal connected to the first output terminal so that a voltage at the input terminal is consistent with a bus voltage, a drain electrode connected to a first node and a current sampling terminal connected to a second node so that the step-down constant-current driver chip responses to the signal at the first output terminal to work, wherein the step-down constant-current driver chip does not require an external power supply capacitor;

an output current setting circuit, connected to the second node and the earth wire and configured to set an output current;

a freewheeling circuit, connected to the first output terminal and the first node;

a transformer, connected to the first node and a second output terminal and configured to convert a voltage between the first output terminal and the first node to an output voltage; and a second filter energy-storage circuit, connected to the first output terminal and the second output terminal and configured to filter the signal at the first output terminal and store electric energy.

2. The BUCK topological circuit according to claim 1, wherein the rectification circuit is connected to the input terminals, a third node, and the earth wire, and is configured to convert an alternating-current signal at the input terminals to a direct-current signal and transmit the direct-current signal to the third node;

the first filter energy-storage circuit is connected to the third node and the earth wire, and is configured to filter a signal at the third node and store electric energy; and the circuit further comprises:

a third filter energy-storage circuit, connected to the third node, the first output terminal and the earth wire and configured to filter the signal at the third node and store electric energy, and transmit a signal obtained by filtering the signal at the third node to the first output terminal.

3. The BUCK topological circuit according to claim 2, wherein the third filter energy-storage circuit comprises:

a second inductor, having a first terminal connected to the third node, and a second terminal connected to the first output terminal; and a third filter energy-storage capacitor, having a first terminal connected to the first output terminal, and a second terminal connected to the earth wire.

4. The BUCK topological circuit according to claim 1, wherein the first filter energy-storage circuit comprises:

a first filter energy-storage capacitor having a first terminal connected to the first output terminal, and a second terminal connected to the earth wire.

5. The BUCK topological circuit according to claim 1, wherein the output current setting circuit comprises:

a resistor, having a first terminal connected to the second node, and a second terminal connected to the earth wire.

6. The BUCK topological circuit according to claim 1, wherein the freewheeling circuit comprises:

a freewheeling diode, having a first electrode connected to the first node, and a second electrode connected to the first output terminal.

7. The BUCK topological circuit according to claim 1, wherein the transformer comprises:

a first inductor, having a first terminal connected to the first node, and a second terminal connected to the second output terminal.

8. The BUCK topological circuit according to claim 1, wherein the second filter energy-storage circuit comprises:

a second filter energy-storage capacitor, having a first terminal connected to the first output terminal, and a second terminal connected to the second output terminal.

* * * * *